3,365,789
WELD INOCULATION WITH TUNGSTEN
CARBIDE POWDER
David C. Brown, Louisville, Ky., assignor, by mesne assignments, to the United States of America as represented by the Secretary of the Army
No Drawing. Filed Aug. 20, 1965, Ser. No. 481,435
2 Claims. (Cl. 29—488)

This invention relates to an improved method of welding and, particularly, to a method of welding employing artificial inoculation.

One of the prime considerations in any heat treatable, welding operation is the changes in the base metal produced thereby and by post weld heat treatments necessary to put the weld metal in a useable condition or to accomplish dimensional stability of the weldment. In metals undergoing phase transformations, such as steel, brass and aluminum alloys, maximum temperature and cooling rates are of extreme importance in determining the degree of such transformation and the attendant variations in physical properties. Where a metal exists in only one phase throughout the welding operation, no changes will occur if the metal is in the fully annealed condition. However, if the metal has been cold worked prior to welding, portions of it which are heated by the welding operation undergo recrystallation and grain growth, the residual stresses of cold working being relieved thereby. However, owing to the restraint exerted by a rigidly welded body upon thermal expansion and contraction, residual stresses from welding may place the weldment in a dimensionally unstable condition. These residual stresses result from the uneven expansion and contraction of the weld during and following the welding. If the weldment must be given a post weld heat treatment to accomplish phase transformations or to relieve the residual stresses from welding undesirable changes in mechanical properties may result. In the case of a material intentionally cold worked to improve the mechanical properties, the entire weldment including the base metal may recrystallize leaving the metal weaker and more ductile than the original metal. In other cases where post weld heat treatment is required to make the weldment dimensionally stable, cracking may occur. In this regard, it has been found that fine grain materials have less tendency to crack during heat treatment than coarse grained materials. Further, as in the case of certain steels, fine grain steels often exhibit greater toughness and shock resistance making them suitable for uses involving moving loads and high impact, particularly at low temperatures.

Accordingly, a principal object of the present invention is to provide a method of welding minimizing the foregoing disadvantages of the prior art.

Another object of the invention is to provide a method of effecting a fine grain weld exhibiting minimal tendency to crack on post heat treatment.

Other objects of the invention will in part be obvious and in part appear hereinafter in the following detailed description.

The present invention relates to a method of obtaining grain refinement in weld joints by artificial inoculation or seeding. The invention stems from the discovery that powders of refractory compounds such as intermetallic compounds can effect a significant reduction in grain size in a weld bead.

In the course of the investigation leading to the present invention, specimens were prepared by clamping two pieces of ⅛-inch aluminum magnesium alloy in a closed square butt relationship. The abutting surfaces were roughened with a file and a 3½ micron diameter tungsten carbide powder was dusted on the roughened surfaces with a small pencil brush. Excess powder was scraped off leaving only that entrapped in the crevices of the roughened surfaces. Welding was then accomplished using the inert gas shielded consumable electrode metal arc process in which argon at 30 cubic feet per hour was used as an inert gas shield, and a consumable electrode 0.030 inch in diameter of 5183 aluminum wire was fed at an arc voltage of 26 using 210 amps of direct current, reversed polarity, and a welding speed of thirty inches per minute.

After a number of specimens had been prepared in accordance with the aforementioned procedure, testing revealed that approximately a 25 to 1 reduction in grain size was obtained; all grains being equiaxed even at the fusion line.

It will be understood that various changes may be made in the method of this invention and joining relationship and materials used and welded may be varied without departing from the spirit and scope of this invention. In particular, other methods of introducing powder into the weld may be used such as through the shielding gas or through an auxiliary injection system, one such system using a fine bore directional nozzle such as a hypodermic needle and a gas propellent such as argon.

Having thus described the invention so that others skilled in the art may be able to understand and practice the same, I state that what I desire to secure by Letters Patent is defined in what is claimed.

I claim:
1. A method of welding comprising roughening a surface on each of two metal articles, dusting the roughened surfaces with tungsten carbide powder, arranging said surfaces in juxtaposition, and fusion welding to effect joining of said articles at said surfaces.

2. A method of welding comprising roughening a surface on each of two metal articles, arranging said surfaces in juxtaposition, and fusion welding to effect joining of said articles at said surfaces while continuously inoculating the joint with tungsten carbide powder through the use of a gaseous carrier.

References Cited
UNITED STATES PATENTS 2,003,019   5/1935   Strobel _____ 29—488 X
3,163,501  12/1964   Zimmer _____ 29—504 X JOHN F. CAMPBELL, *Primary Examiner.*
R. F. DROPKIN, *Assistant Examiner.*